US007068654B1

(12) United States Patent
Joseph et al.

(10) Patent No.: US 7,068,654 B1
(45) Date of Patent: Jun. 27, 2006

(54) SYSTEM AND METHOD FOR PROVIDING MASQUERADING USING A MULTIPROTOCOL LABEL SWITCHING

(75) Inventors: Boby Joseph, Mount Prospect, IL (US); Satish Amara, Mount Prospect, IL (US); Michael Freed, Pleasanton, CA (US)

(73) Assignee: 3Com Corporation, Marlborough, MA (US)

( * ) Notice: Subject to any disclaimer, the term of this patent is extended or adjusted under 35 U.S.C. 154(b) by 763 days.

(21) Appl. No.: 09/837,106

(22) Filed: Apr. 18, 2001

(51) Int. Cl.
*H04L 12/28* (2006.01)
(52) U.S. Cl. ...................... 370/392; 370/400
(58) Field of Classification Search ............... 370/389, 370/392, 395.3, 395.31, 395.5, 395.52, 398, 370/399, 400, 401; 709/220
See application file for complete search history.

(56) References Cited

U.S. PATENT DOCUMENTS

| | | | |
|---|---|---|---|
| 5,991,300 A * | 11/1999 | Tappan ....................... | 370/392 |
| 6,381,638 B1 * | 4/2002 | Mahler et al. .............. | 709/220 |
| 6,466,985 B1 * | 10/2002 | Goyal et al. ................ | 709/238 |
| 6,477,166 B1 * | 11/2002 | Sanzi et al. ............... | 370/395.1 |
| 6,510,135 B1 * | 1/2003 | Almulhem et al. ......... | 370/229 |
| 6,563,793 B1 * | 5/2003 | Golden et al. .............. | 370/236 |
| 6,628,649 B1 * | 9/2003 | Raj et al. .................... | 370/360 |
| 6,665,273 B1 * | 12/2003 | Goguen et al. ............. | 370/252 |
| 6,683,865 B1 * | 1/2004 | Garcia-Luna-Aceves et al. ......................... | 370/349 |
| 6,693,878 B1 * | 2/2004 | Daruwalla et al. .......... | 370/235 |
| 6,760,775 B1 * | 7/2004 | Anerousis et al. .......... | 709/238 |

OTHER PUBLICATIONS

R. Braden, Ed. et al., "*Resource ReSerVation Protocol (RSVP)*", Network Working Group, RFC-2205, Sep. 1997, pp. 1-112.
E. Rosen et al., "*Multiprotocol Label Switching Architecture*", Network Working Group, RFC-3031, Jan. 2001, pp. 1-61.
L. Andersson et al., "*LDP Specification*", Network Working Group, RFC-3036, Jan. 2001, pp. 1-62.
International Telecommunication Union, "*Pulse Code Modulation (PCM) Of Voice Frequencies*", G.711, 1993, pp. 1-10.

(Continued)

*Primary Examiner*—Chau Nguyen
*Assistant Examiner*—Jung Park
(74) *Attorney, Agent, or Firm*—McDonnell Boehnen Hulbert & Berghoff LLP

(57) ABSTRACT

A system and method for transmitting information between a source host and a destination host. A source host generates a message and forwards the message via a label switched path to the destination host so that when a central routing module receives the message, the message includes a label. A central routing module establishes a local master mapping table including a plurality of physical addresses, and each of the plurality of physical addresses is associated with a unique identifier such as a label. When a switch egress module receives the message with the label, the switch egress module determines a physical address associated with the label, maps the physical address to the message, and forwards the message to the destination host associated with the label.

20 Claims, 10 Drawing Sheets

OTHER PUBLICATIONS

International Telecommunication Union, "*A High Quality Low-Complexity Algorithm For Packet Loss Concealment With G.711*", G.711, Appendix I, Sep. 1999, pp. 1-19.

International Telecommunication Union, "*A Comfort Noise Payload Definition For ITU-T G.711 Use In Packet-Based Multimedia Communication Systems*", G.711, Appendix II, Feb. 2000, pp. i-11.

International Telecommunication Union, "*Dual Rate Speech Coder For Multimedia Communications Transmitting At 5.3 And 6.3 kbit/s*", G.723.1, Mar. 1996, pp. i-27.

International Telecommunication Union, "*Silence Compression Scheme*", G.723.1, Annex A, Nov. 1996, pp. i-16.

International Telecommunication Union, "*Scalable Channel Coding Scheme For Wireless Applications*", G.723.1, Annex C, Nov. 1996, pp. i-18.

International Telecommunication Union, "*40, 32, 24, 16 kbit/s Adaptive Differential Pulse Code Modulation (ADPCM)*", G.726, 1990, pp. 1-57.

International Telecommunication Union, "*Description Of The Digital Test Sequences For The Verification Of The G.726*", G.726, Appendix II, Test Vectors, Mar. 1991, pp. 1-14.

International Telecommunication Union, "*Comparison Of ADPCM Algorithms*", Rec. G.726, Appendix III, Rec. G.727, Appendix II, May 1994, pp. I-41.

International Telecommunication Union, "*Extensions Of Recommendation G.726 For Use With Uniform-Quantized Input And Output*", G.726, Annex A, Nov. 1994, pp. i-58.

International Telecommunication Union, "*Coding Of Speech At 8 kbit/s Using Conjugate-Structure Algebraic-Code-Excited Linear-Prediction*", G.729, Mar. 1996, pp. i-35.

* cited by examiner

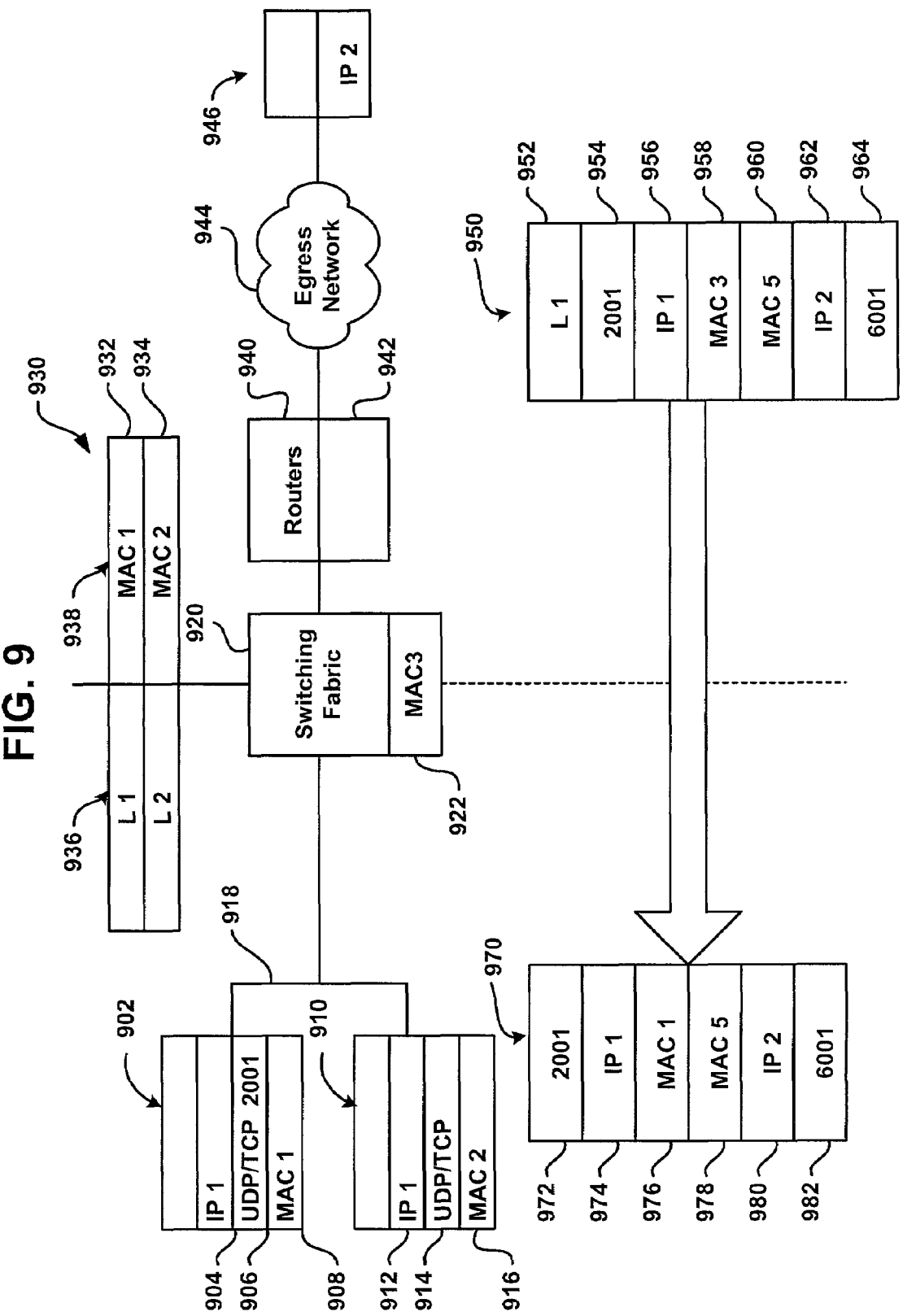

SYSTEM AND METHOD FOR PROVIDING MASQUERADING USING A MULTIPROTOCOL LABEL SWITCHING

FIELD OF THE INVENTION

The present invention relates to communications in computer networks. More particularly, it relates to providing masquerading using a multi-protocol label switching architecture.

BACKGROUND OF THE INVENTION

With demand for the Internet and data services continuing to rise dramatically, today's telecommunications carriers develop infrastructures for providing enhanced data services that are arranged to deliver enormous volumes of packet-based traffic over public networks. At the same time, the infrastructures traditionally used for carrying voice traffic over the public switched telephone network ("PSTN") lack the capacity to accommodate this increase in data transmission. As a result, a majority of today's telecommunication carriers are seeking cost-effective solutions for delivering voice and data services over a unified infrastructure that bridges the existing divisions between the circuit-switched public switched telephone networks and packet-based networks.

The evolving, next-generation networks offer reliability of the circuit-switched networks as well as the speed and economy of the packet-switched networks. The new networks are typically built on a softswitch-based architecture of media gateways, call servers, and application servers. This architecture is replacing the existing voice hierarchy of access transport, switches, signaling and enhanced service devices. Using the converged networks, service providers and carriers are bundling new services and applications into competitive solutions that are revolutionizing telecommunications marketplace.

A typical converged voice and data network includes a media gateway controller, a media gateway, and a signaling gateway. A media gateway provides an interface between a public switched telephony network and an Internet Protocol network. The media gateway typically terminates several T1 links, which may carry 24 pulse code modulation signals using time-division multiplexing at an overall rate of 1.544 million bits per second ("Mbps"), and uses an encoder to convert a call into a packet format. The media gateway normally offers a range of encoding and compression algorithms such as those recommended by ITU-T, for example, G.711, G.723, G.726, and G.729 to minimize the bandwidth used on a packet network. Media gateway controllers coordinate the activities of media gateways and signaling gateways to setup and tear down calls. Additionally, the media gateway controllers control the enhanced services platforms and provide data to the billing platform for customer billing.

A typical voice and data network further includes a signaling gateway interface between a signaling system 7 ("SS7") and a packet network. On a public switched telephone network, the signaling system 7 may include a system that puts information required to set up and manage telephone calls in a separate network rather than within the same network that the telephone call is initiated on. Typically, the signaling information is in the form of a digital packet, and the signaling system 7 uses an out-bound-signaling, such that the signaling (control) information travels on a separate, dedicated channel such as a 56 or 64 kilo bites per second ("Kbps") channel rather than the same channel that is used for the telephone calls. Using the signaling system 7, telephone calls can be set up more efficiently and with greater security, and special services such as call forwarding and wireless roaming services are easier to add and manage than using different types of standards.

Some of the problems associated with using gateways or other internetworking devices known in the art to interconnect computer networks that operate at different transmission capacities, concern scarcity of Internet Protocol ("IP") addresses. The Internet Protocol is an addressing protocol designed to facilitate routing of data traffic within a network or between networks. The Internet Protocol is used on many computer networks including the Internet, intranets and other networks. Current versions of Internet Protocol, such as a version-4 ("Ipv4"), are becoming obsolete because of the limited address space. With a 32-bit address-field, it is possible to assign $2^{32}$ different addresses, which is 4,294,967,296, or greater than 4 billion globally unique addresses.

There are two types of Internet Protocol addresses: global Internet Protocol network addresses and local Internet Protocol addresses. Internal sub-networks use local addressing. Local addressing may be either any addressing that is different from Internet Protocol addressing, or non-unique usage of Internet Protocol addresses. In either case, local addresses on a subnet are not used on the external, global Internet. When a device or node using local addressing desires to communicate with the external network, its local address is translated to a common external Internet Protocol address used for communication with an external network by a network address translation device. That is, network address translation allows one or more global Internet Protocol addresses to be shared among a larger number of local addresses.

Internet Protocol masquerading is known in the art and is a Linux networking function similar to the network address translation function. For example, Internet Protocol masquerading allows a set of transport identifiers, such as a Transmission Control Protocol ("TCP") port, a User Datagram Protocol ("UDP") port or an Internet Control Message Protocol ("ICMP") query identifier, to be multiplexed into transport identifiers of a single common external Internet Protocol address. For packets outbound from a private network using local addresses, a masquerading network entity, such as a masquerading gateway, translates a source local Internet Protocol address, source transport identifier and other fields of the outgoing traffic, such as a Transmission Control Protocol field, a User Datagram Protocol field, or an Internet Control Message Protocol checksum field, to an external global Internet Protocol address and external transport identifiers. Thus, the masquerading network device converts the internal connections so that they appear to originate from the masquerading network device itself. For inbound packets, the masquerading network device arranges so that data coming back to a masquerading connection is relayed back to the proper originating network device.

In network systems where one or more network devices share a common address such as an IP address, external devices may communicate with any of the network devices using the common address. However, since each address is shared, the address translation has to take place for data communications with external network devices. Thus, it is desirable to develop a system and methods for improved data forwarding in network systems that employ shared network address mechanisms.

SUMMARY OF THE INVENTION

In accordance with preferred embodiments of the present invention, some of the problems associated with providing network address translation for hosts using a common globally routable address have been solved.

One aspect of the invention includes a system and method for routing information between a first host and a second host. In one embodiment, a network address of each host sharing a globally-routable network address with other hosts on a local network is assigned to a Data Link Layer (Layer 2) identifier such as a Multiprotocol Label Switching label that is stored in a local routing table and is used on a central switch egress module to route data to the hosts associated with the identifiers. In one embodiment, a Layer 2 identifier is assigned to a host while establishing transmission path with a Resource Reservation Protocol. For example, a host may be arranged to process a plurality of VoIP calls. According to an exemplary embodiment, all VoIP packets for the host include the same unique identifier associated with the host when the packets are received on the local switching module, and the local switching module uses the identifier in the packets to route the packets to the host. Therefore, the local routing table on the local switching module is compact since each host is associated with a single Layer 2 identifier. Further, sourcing Layer 2 information on the local switching module involves much less overhead compared to gleaning Network Layer (Layer 3) or Transport Layer (Layer 4) information that is done using the existing routing mechanisms. Further, if the packets get fragmented on a transmission path to a local switching module, the module has to reassemble the packets to glean Layer 4 information prior to routing the packet to one of the host. In such an embodiment, if the router is not able to reassemble the packets, the router drops the packets. Using the Layer 2 identifiers for routing packets to hosts, fragmentation does not affect the router's ability to forward the packets to the hosts.

These as well as other aspects and advantages of the present invention will become more apparent to those of ordinary skill in the art by reading the following detailed description, with reference to the accompanying drawings.

BRIEF DESCRIPTION OF THE DRAWINGS

Exemplary embodiments of the present invention are described with reference to the following drawings, in which:

FIG. 9 is a block diagram illustrating an exemplary system for processing incoming data packets according to an exemplary embodiment.

DETAILED DESCRIPTION OF PREFERRED EMBODIMENTS

System architecture

Figure 1:
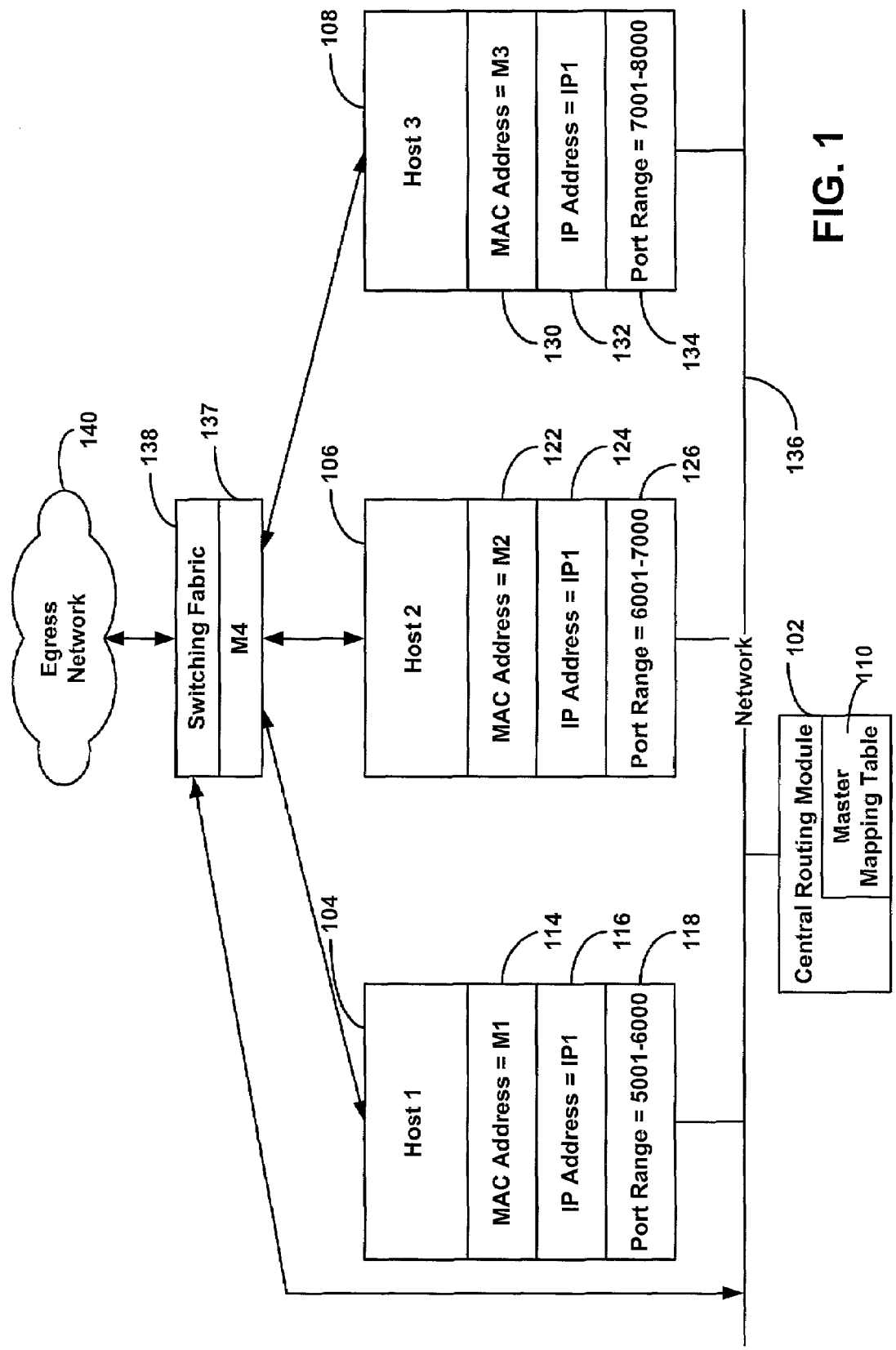
FIG. 1 is a block diagram illustrating an exemplary system in which exemplary embodiments may be implemented.

Referring now to FIG. 1, a central routing module 102, a first host 104, a second host 106, a third host 108, and a switching fabric 138 are coupled to a network 136. The first host 104, second host 106, and third host 108 are also coupled to the switching fabric 138. The switching fabric 138 is coupled to an egress network 140. However, the network may be coupled to any number of hosts, and three hosts are used here for illustrative purposes only.

The first host 104 includes a physical address field 114; the second host 106 includes a physical address field 122; and the third host 108 includes a physical address field 130. The physical address fields 114, 122, and 130 contain physical addresses M1, M2, and M3, respectively. The switching fabric 138 includes a physical address field 137, in this case, having a physical address M4. The physical address fields 114, 122, 130, and 137 may contain Layer 2 addresses, according to the Open System Interconnection ("OSI") model. In one embodiment, the physical address fields 114, 122, 130, and 137 may contain Medium Access Control ("MAC") addresses. However, the physical address fields 114, 122, 130, and 137 may contain any type of address that uniquely identifies a physical device, and the physical address fields are not limited to contain MAC addresses.

The first host 104, the second host 106, and the third host 108 also include globally-routable address fields 116, 124, and 132, respectively. In one embodiment, the globally-routable address fields contain Layer 3 addresses, according to the OSI model, for example, IP addresses. In this case, the globally-routable address fields 116, 124, and 132 all contain the same IP address, IP1. The globally-routable address fields 116, 124, and 132 may be used by external devices (e.g., connected to the egress network 140) to access the first host 104, the second host 106, and the third host 108.

The first host 104, the second host 106, and the third host 108 additionally include sub-identifier fields 118, 126, and 134, respectively. The sub-identifier fields 118, 126, or 134 may contain an identifier such as a number or a range of numbers, which are assigned to a host. In one embodiment, the sub-identifier fields may include Layer 4 addresses, for example, port numbers. As shown, sub-identifier field 118 may contain a port number in the range of 5001–6000. Additionally, the sub-identifier field 126 may contain a port number in the range 6001–7000. In addition, the sub-identifier field 134 may contain a port number in the range 7001–8000. Alternatively, the sub-identifier field may indicate a Security Parameter Index. However, other examples of sub-identifier types are possible as well, and the exemplary embodiments are not limited to sub-identifier fields including unique port numbers.

The hosts 104, 106, and 108 may be any type of device that implements any type of processing function. For example, the hosts 104, 106, and 108 may be VOIP modules such as Digital Signal Processing ("DSP") cards. However, other types of hosts could also be used, and the exemplary embodiment is not limited to the VoIP modules. In such an embodiment, the sub-identifiers assigned to the hosts may include port numbers assigned to each host upon a detection of an incoming VoIP call.

The network 136 may be any type of network using any type of message transmission network that sends information between entities. For example, the network 136 may be an Ethernet Local Area Network (LAN) connection that transmits information at various speeds.

In one convenient embodiment, the system shown in FIG. 1 may use a layered addressing scheme to pass messages between the first host 104, the second host 106, and the third host 108 as well as other external devices. For example, the first host 104, the second host 106, and the third host 108 may use the same network-layer address (e.g., Layer 3 IP address) for communication with external devices. On the other hand, each host may also use a different transport-layer address (e.g., Layer 4 port number or Security Parameter Index) as an address.

The switching fabric 138 may be any switch used to switch data. Illustratively, the switching fabric 138 may include a multi-layer Ethernet switch with a network processor or any other switch having Layer 3 processing capabilities.

The egress network 140 may be any type of network or a combination of networks. For example, it may be a wireless network, an IP network, the Internet, an ATM network, a frame relay network, an Ethernet, or any combination of these networks. Other examples and combinations are possible as well.

In one example of the operation of the system in FIG. 1, the first host 104, the second host 106, and the third host 108 may execute application programs. For example, if the host is a module that implements VoIP calling, the host may generate calls destined for other hosts. As a result, the first host 104, the second host 106, or the third host 108 ("source host") may create messages destined for another host ("destination host"). For example, the first host 104 (the source host) may desire to send messages to the third host 108 (the destination host). In another example, the third host 108 (the source host) may desire to send messages to a host (destination host) located at the egress network 140. In another example, the host located at the egress network 140 may desire to send messages to the host that shares a globally routable address with other hosts. According to an exemplary embodiment, to unique identify the host that shares the same globally routable address with other hosts, a predetermined identifier such as a Multiprotocol Label Switching ("MPLS") label is assigned to a physical address of the host. Information on the MPLS may be found on the World Wide Web at the Uniform Resource Locator ("URL") "www.ietf.org" in a Request for Comments ("RFC"), RFC-3031.

The MPLS is a technology for using a label-based forwarding that combines Layer 2 switching with Layer 3 routing, while reducing the complexity and operational cost. The MPLS technology typically operates over various link-level technologies such as a packet-over-Sonet, frame relay, Asynchronous Transfer Mode ("ATM"), Ethernet, and a token ring network.

In a typical MPLS network, a label edge router ("LER") determines a forwarding equivalence class ("FEC") for the incoming packets that, based on the assigned FEC, are forwarded in the same manner (e.g., over the same path, with the same forwarding treatment). In the MPLS, the assignment of a particular packet to a particular FEC is done once, as the packet enters the network, and the FEC to which the packet is assigned is encoded as a short, fixed length value known as a label. Most commonly, a packet is assigned to a predetermined FEC based on, for example, its network layer destination address. When the packet is forwarded to its next hop, the label is sent along with it, i.e., the packets are labeled before they are forwarded. At subsequent hops, there is no further analysis of the packet's network layer header. Rather, the label is used as an index into a table that specifies the next hop and a new label. At subsequent hops, routers, known as label switched routers ("LSRs") use the label information from the packet to determine the outgoing link and a new label for the outgoing link. The LSR then swaps the label in the MPLS header with the new label, and forwards the packet. Thus, in the MPLS paradigm, once a packet is assigned to a FEC, subsequent routers do no further header analysis, and all forwarding is driven by the labels.

Label switched paths are controlled in a distributed fashion. Each router negotiates a label for each FEC with its neighbors along the path. Information on the topology of the network is maintained by one or more routing protocols such as an open shortest path first ("OSPF"), a routing information protocol ("RIP"), or a border gateway protocol ("BGP"), for example. For each route or an aggregation of routes, a neighbor router assigns a label, and this information is distributed to the neighboring routers using a label distribution protocol ("LDP"). More information on the LDP may be found on the World Wide Web at the URL "www.ietf.org" in the RFC-3036. Two LSRs that use the LDP to exchange a label/FEC binding information are known as "label distribution peers" with respect to the binding information they exchange.

According to an exemplary embodiment, the central routing module 102 includes a master mapping table 110. The master mapping table 110 may include a listing of a physical address of each host with an associated label so that each host such as the host 104 is associated with one or more labels, and the master mapping table is very compact and has a small number of entries, since each host is assigned to a single label. Further, since labels are associated with the Layer 2 network protocol, and gleaning Layer 2 information involves much less overhead compared with the overhead involved in gleaning Layer 3 and Layer 4 information that occurs in a typical routing mechanism. Further, in an embodiment where a packet is fragmented such that an IP packet is broken into smaller pieces to fit requirements of a physical network, a conventional router has to reassemble the packet in order to glean, for example, Layer 4 information to determine a forwarding route for the packet, or, otherwise, the router drops the packet. According to an exemplary embodiment, packet forwarding and masquerading are based on labels associated with the packets, and thus, even if the packets are fragmented, the fragmentation does not affect the ability of the routers to forward and masquerade packets.

In another example of the operation of the system of FIG. 1, the host 104, 106, or 108 may generate a message destined for the egress network 140, and specifically, to a device attached to the egress network 140. The message may have a source globally-routable address, a source physical address, a destination physical address, and a label that is attached to the message by the switching modules. Of course, the message may have other fields, as well.

In this case, the source globally-routable address may be IP1, the source physical address may be a MAC address of one of the hosts 104, 106, or 108, the destination physical address may be the physical address of a device attached to the egress network 140. When the message is received on the switching fabric 138, the switching fabric 138 may replace the source physical address in the message with the physical address of the switching fabric 138 (M4) and may attach a label associated with the first switching module on a label switching path to the destination host on the egress network. The switching fabric 138 may then forward the message to the egress network 140.

In another example of the operation of the network of FIG. 1, a message destined for one of the hosts 104, 106, or 108 may be received by the switching fabric 138. The message may have a destination IP address, a source physical address, a destination physical address, and a destination label. In this case, the destination globally-routable address may be the IP1, the source physical address may be a MAC address of a device attached to the egress network 140, the destination physical address may be the physical address of the switching fabric 138 (M4), and the destination label may define a label associated with the route to the destination network device. The switching fabric 138 obtains the physical address corresponding to the destination host based on the label attached to the incoming packet and substitutes this physical address into the destination physical address field of the packet. The packet can then be routed to its destination host 104, 106, or 108.

Figure 2:
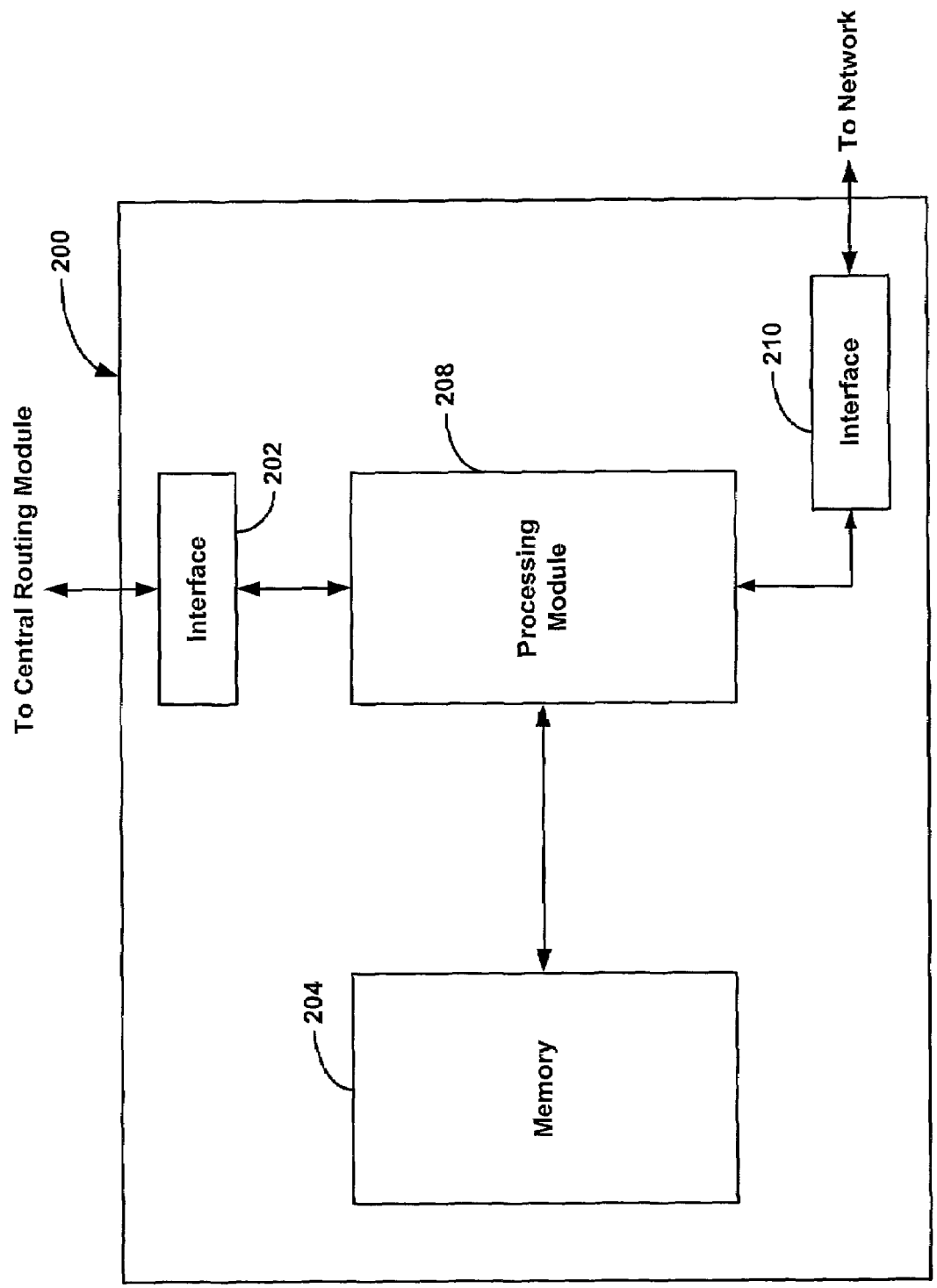
FIG. 2 is a block diagram illustrating a host entity according to an exemplary embodiment.

Referring now to FIG. 2, one embodiment of a host is described. A host 200 includes a first interface 202, a memory 204, a processing module 208, and a second interface 210. The first interface 202 is coupled to the processing module 208 and a central routing module. The processing module 208 is also coupled to the memory 204 and the second interface 210. The second interface 210 is also coupled to a network, for example, an Ethernet LAN. Alternatively, a single interface may be used in place of the first interface 202 and the second interface 210.

The first interface 202 may buffer and store information sent to be sent to the central routing module or received from the central routing module. The information received from the central routing module may include a local mapping table, for example.

The processing module 208 may be any type of processing device. For instance, the processing module 208 may be a microprocessor. Of course, other examples of processing devices are possible.

The memory 204 may be any type of dynamic memory. For example, it may be a random-access-memory (RAM). Of course, other types of memories are possible. The memory 204 may contain a set of computer instructions, which are executed by the processing module. The instructions may perform any application programs at the host 200.

The second interface 210 may buffer and store information sent to the network or received from the network. The information sent to the network may include messages destined for another host. The information received from the network may include messages sent by other hosts to the host 200. For example, the hosts may communicate with each other using a method described in the co-pending U.S. Application Attorney Docket No. 00-1072, filed on Jan. 31, 2001.

Figure 3:
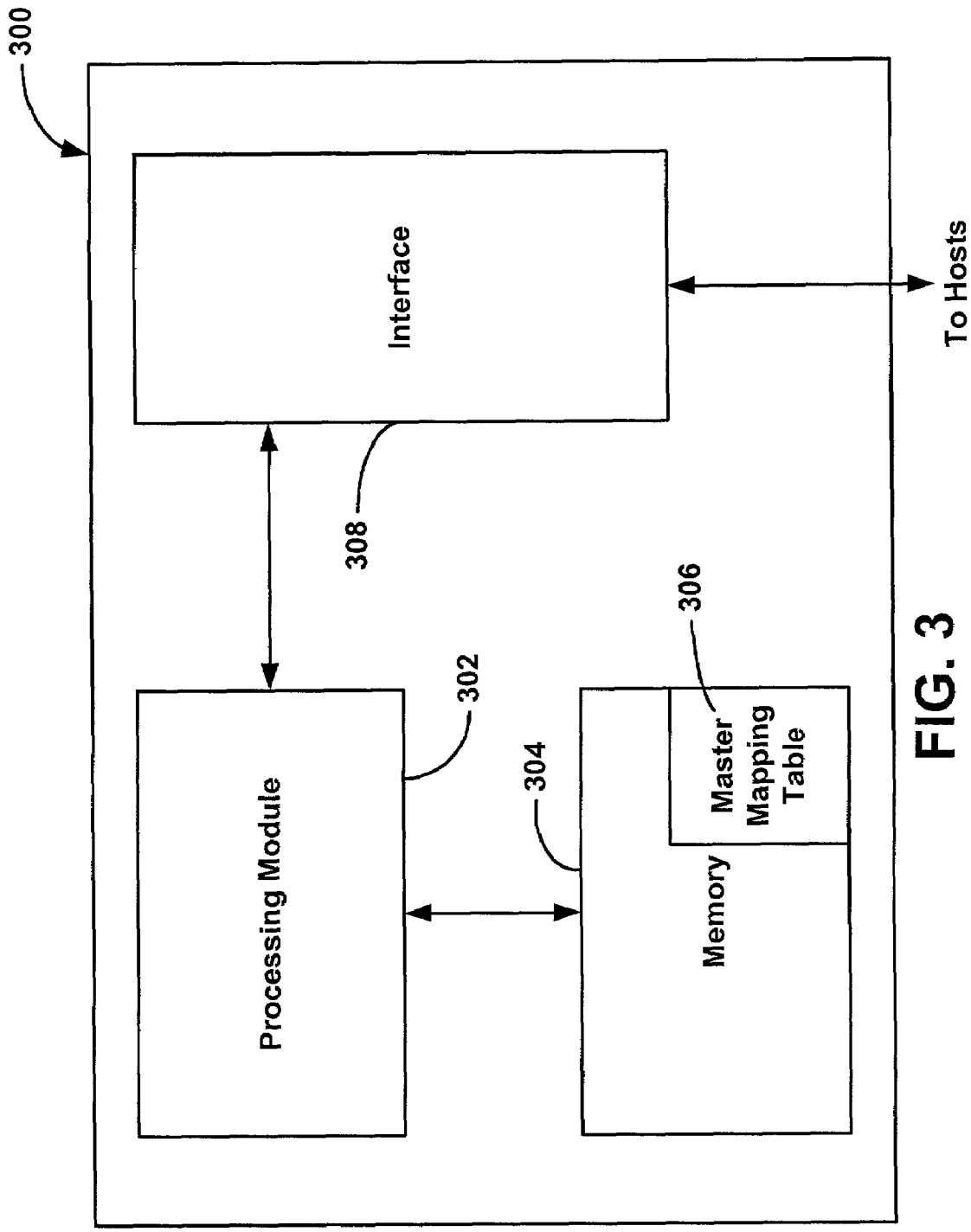
FIG. 3 is a block diagram illustrating a central processing module according to an exemplary embodiment.

Referring now to FIG. 3 a central routing module 300 is described. The central routing module includes a processing module 302, a memory 304, and an interface 308. The processing module 302 is coupled to the memory 304 and the interface 308. The interface 308 is coupled to the hosts (e.g., hosts 104, 106, or 108 in FIG. 1).

The processing module 302 may be any type of processing device. For instance, it may be a microprocessor. However, different types of processing devices are possible.

The memory 304 may be any type of dynamic memory. For example, it may be a random-access-memory (RAM). Of course, other types of memory are possible. The memory 304 may contain a set of computer instructions, which are executed by the processing module. The instructions may perform an application program on the processing module 300. For example, the central processing module may perform all Layer 2 or Layer 3 routing decisions on the network. Further, for example, the interface 308 may include a buffer or a set of buffers. The interface 310 transmits and receives information from the hosts.

In one example of the operation of the central routing module 300, the processing module 302 may construct a master mapping table 306. The master mapping table 306 may contain all mappings of MPLS labels to physical addresses. The information used to construct the routing table may be generated based on a label assignment for each host.

The processing module 302 may transmit a portion of the master mapping table (a local mapping table) to an egress switch, such as the switching fabric 138 illustrated in FIG. 1.

Figure 4:
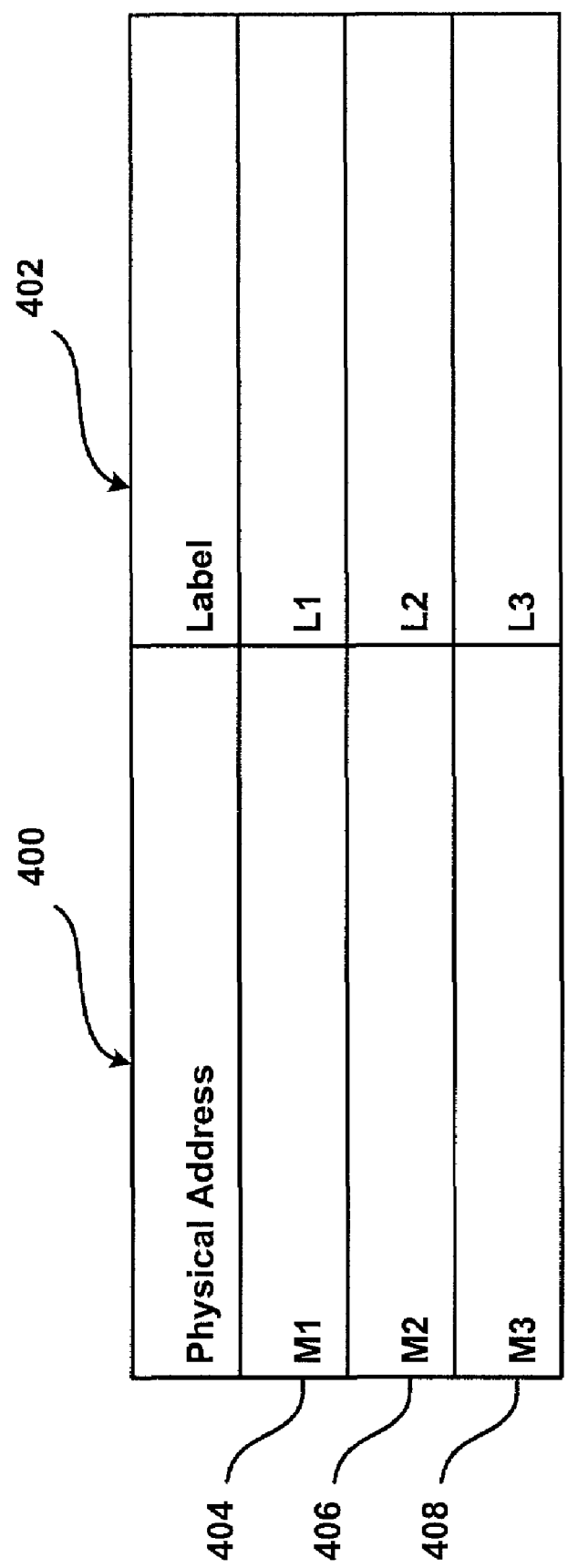
FIG. 4 is a master mapping table according to an exemplary embodiment.

Referring now to FIG. 4, the master mapping table 110 is described. The master mapping table 110 includes a physical address column 400 and a label column 402. The master mapping table 110 includes a first row 404, a second row 406, and a third row 408. The first row 404 indicates that the Layer 2 physical address of M1 is associated with the label L1. The second row 406 indicates that the Layer 2 physical address of M2 that is associated with the label L2. The third row 408 indicates that the Layer 2 physical address of M3 is associated with the label L3. The master mapping table 110 may be generated on the central routing module 300, and it may be stored on the central routing module and an egress switch, such as the switching fabric 138 illustrated in FIG. 1.

An exemplary system and methods for masquerading according to an exemplary embodiment are based on the MPLS and utilize a Resource Reservation Protocol ("RSVP"). Information on the RSVP may be found on the World Wide Web at the URL "www.ietf.org" in the RFC-2205. The RSVP is a reservation setup and control protocol that provides a type of circuit-emulation on IP networks. The RSVP is used by hosts to request specific quality of service ("QoS") from the network for particular application data streams or flows. The RSVP is also used by routers to deliver QoS requests to all nodes along the paths of the flows and to establish and maintain state for providing the requested QoS.

In a typical RSVP scenario, source hosts characterize outgoing traffic, for example, in terms of the upper and lower bounds of bandwidth, delay, and jitter. To initiate the process, an RSVP source host transmits an RSVP PATH message downstream to unicast or multicast routes provided by the routing protocols, following the paths of data. An RSVP PATH message may define traffic specification ("Tspec") information for a unicast or multicast receiver destination address. Each RSVP-enabled router along the downstream path establishes a "path state" that includes the previous source address of the RSVP PATH message (i.e. the next hop upstream towards the source host). To make a resource reservation, upon a receipt of the RSVP PATH message, a receiver sends an RSVP RESV (reservation request) message upstream to the source of the RSVP PATH message. In addition to the Tspec, the RSVP RESV message includes a required QoS level in an Rspec, and characterizes the packet for which a reservation is being made, such as a transport protocol or a port number, in a "filter-spec". In a combination, the Rspec and the filter-spec represent a "flow descriptor" that routers use to identify the reservation.

In a typical scenario, when a router receives an RSVP RESV message, it employs an admission control process to authenticate the request and allocate resources specified in the message. For example, if the request cannot be satisfied due to lack of resources or authorization failure, the router may return an error back to the receiver. If the router accepts the reservation, the router sends the RSVP RESV message to the next router. When the last router receives the RSVP RESV message and accepts the request, it sends a confirmation message back to the receiver. In one embodiment, the last router may include a router that is closest to the source host or, alternatively, it may include a router at a reservation merge point for multicast flows.

An RSVP RESV message consists of a common header, followed by a body consisting of a number of variable-length "objects" that include, among other parameters, filter-spec data and flow-spec data. According to an exemplary embodiment, an RSVP RESV message includes a new object called a LABEL object. In one embodiment, when an LSR generates and sends a RSVP RESV message for a new RSVP flow, the LSR allocates a label from a pool of free labels and creates an entry in its label forwarding information base ("LFIB"). For example, the LFIB may include a number of label pairs, where each label pair includes an incoming label and an outgoing label. Thus, when the LSR allocates the label, the LSR creates an entry in the LFIB with the in-coming label set to the allocated label, and sends out the RSVP RESV message containing this label in the LABEL object of the RSVP RESV message to a next hop LSR. Upon a receipt of the RSVP RESV message, the next hop LSR populates its LFIB with the received label as an outgoing label. It then allocates a new label to use as an incoming label, pairs it with the outgoing label in the LFIB, and inserts the new label in the LABEL object of the RSVP RESV message before sending it upstream to a next hop router. The process continues until the RSVP RESV message reaches the last hop adjacent to the destination host.

Figure 5A:
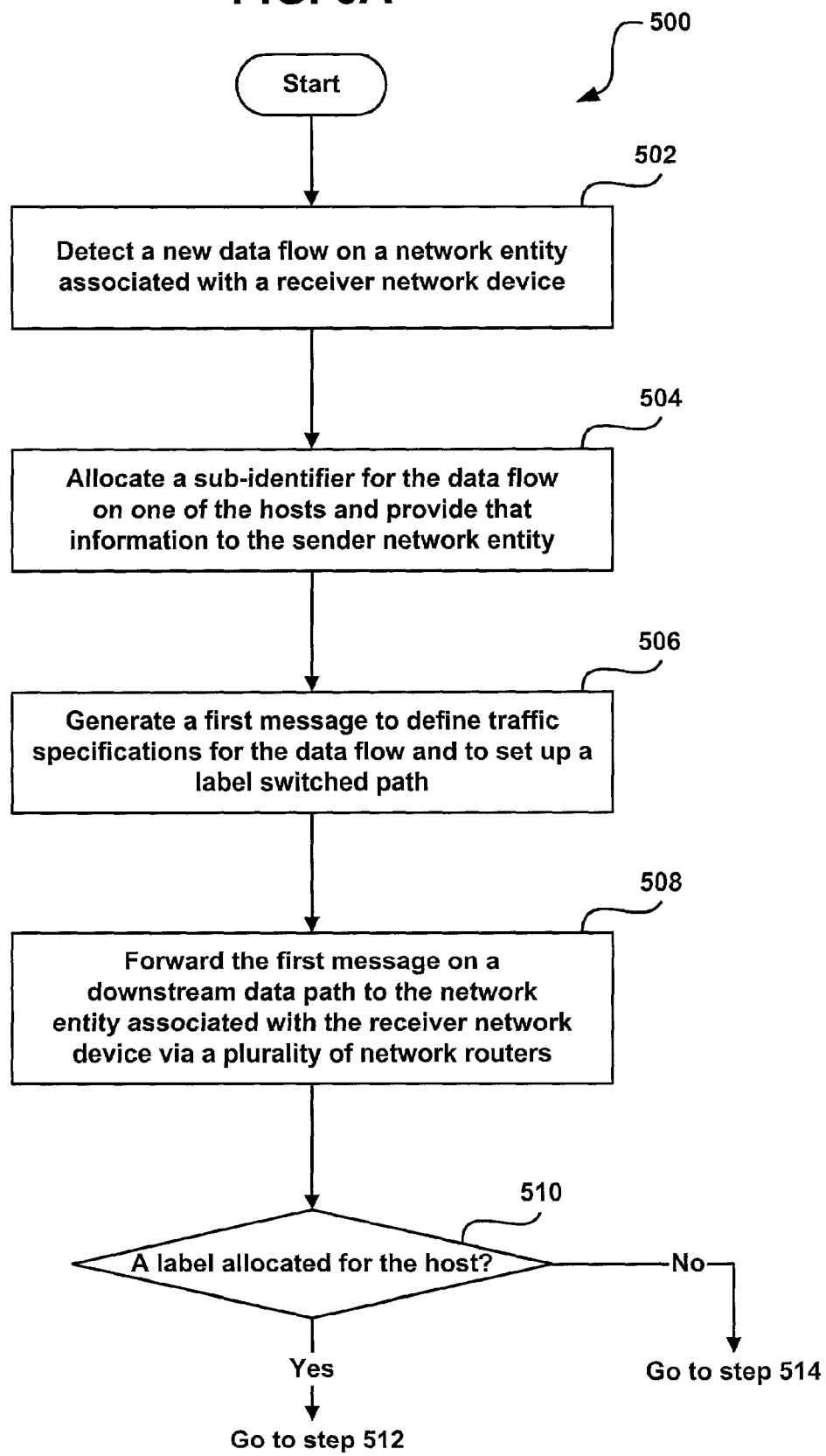
FIGS. 5A and 5B are a flow chart illustrating a method for label allocation for a host according to an exemplary embodiment.
Figure 5B:
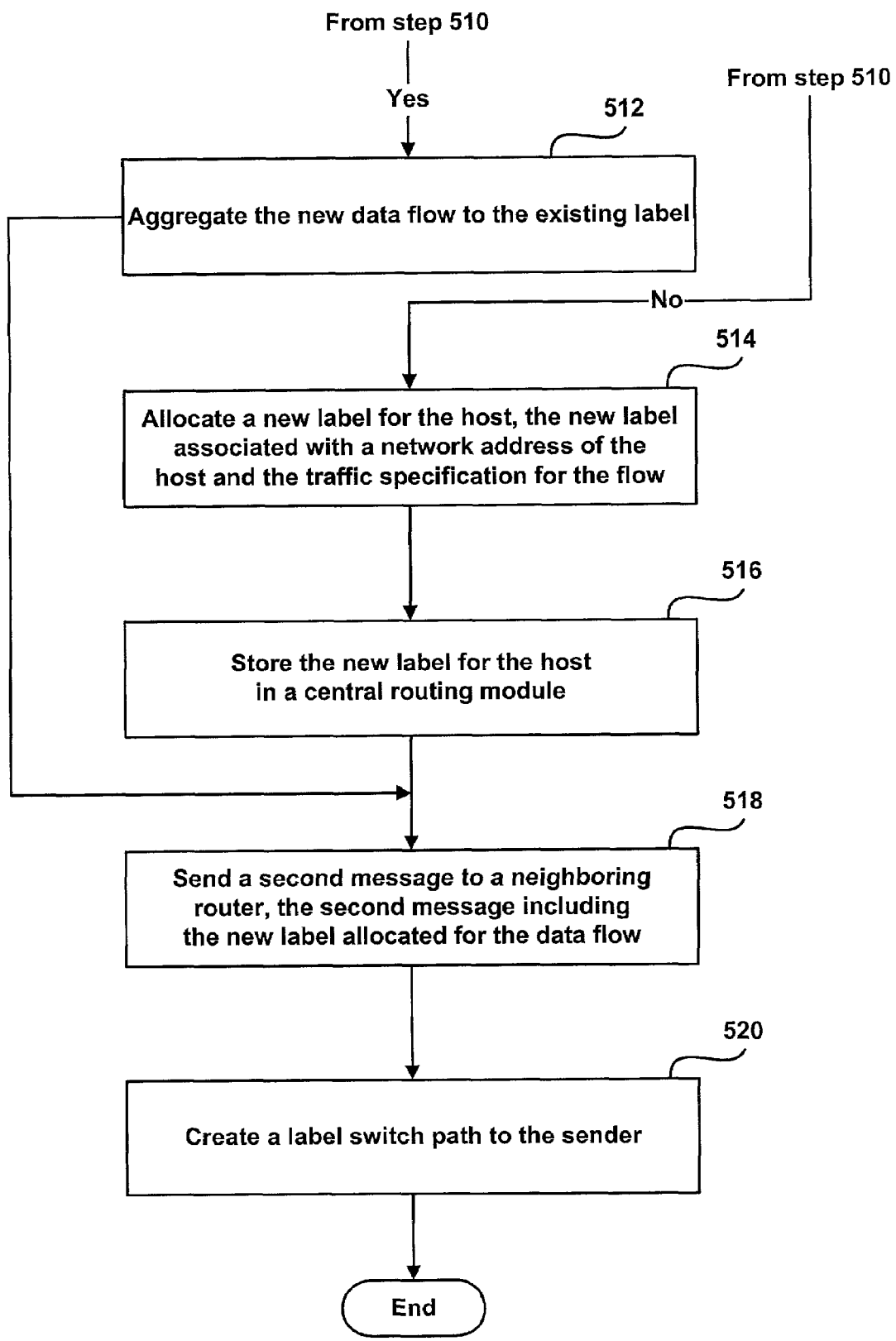

FIGS. 5A and 5B illustrate an exemplary method 500 for label allocation for a host that shares the same network address with a plurality of other host for communication with network devices on an external network. At step 502, a network entity associated with a plurality of hosts such as VoIP modules detects a new outgoing data flow packet such as an outgoing VoIP call terminating on a host located on an external network. In one embodiment illustrated in FIG. 1, the network entity includes a switching fabric 138 of a gateway including a plurality of hosts such as VoIP modules 104, 106, or 108.

At step 504, the network entity allocates a new sub-identifier for the outgoing flow on one of the hosts and sends that information to the host. In one embodiment, the network entity may allocate an UDP port for the outgoing data flow on one of the hosts. However, the exemplary embodiment is not limited to allocating an UDP port for the outgoing flows, and different embodiments are possible as well. In one embodiment, the network entity allocates the UDP port for the incoming data flow using a router server in communication with the network entity, and uses a signaling server to communicate the allocated port number to the source host and the destination host.

At step 506, a first message defining traffic specification requirements for the data flow is generated at the source host entity using a first protocol. The traffic specification requirements may include traffic characteristics of the data flow that the source host will generate. Further, for example, the first protocol may include the RSVP protocol, and the first message may include an RSVP PATH message. At step 508, the first message is forwarded on a downstream data path to the receiver host via a plurality of network routers.

At step 510, when the network entity associated with the host receives the first message, the network entity determines whether a label has been allocated for the host. In an exemplary embodiment, the network entity may include a central master mapping table that defines network address mapping to labels associated with network addresses of the hosts. For example, the master mapping table may include a plurality of network address fields having network addresses of each host and a plurality of label fields having labels associated with each network address. In one embodiment, the network addresses include Layer 2 physical network addresses, and the labels include MPLS labels. In one embodiment, a network address is associated with a single label; however, the exemplary embodiments are not limited to the one-to-one mapping, and a network address could be associated with more than one label.

If the central master mapping table includes an entry defining a mapping of the network address associated with the receiver host to a predetermined label, at step 512, the network entity aggregates the new data flow to the existing label. Alternatively, if the central master mapping table does not include the network address mapping to the predetermined label, at step 514, the network entity allocates a new label for the host. According to an exemplary embodiment, when the network entity allocates new labels for hosts, the network entity creates new entries in the central master mapping tables. The new entries include mappings between the allocated labels and network addresses for which the labels have been allocated. Further, the entries in the table may define QoS information associated with each newly allocated label. Thus, when the network entity allocates the new label for the host, at step 516, the network entity stores the mapping between the network address of the receiver host and the newly allocated label in the central master mapping table.

At step 518, the network entity generates a second message using the first protocol and sends the second message to one or more neighboring routers. According to an exemplary embodiment, the second message includes a RSVP RESV message and includes the label allocated for the data flow. As illustrated in FIGS. 5A and 5B, the label in the second message may include the new label allocated for the data flow at step 514, or it may include the existing label retrieved from the central master mapping table to which the data flow has been aggregated at step 512.

At step 520, a label switched path is created between the hosts associated with the data flow. According to an exemplary embodiment, the label switched path is created while the second message traverses a plurality of routing devices to a source host. For example, the routing devices may include label switch routers that create entries in their databases defining received labels as outgoing labels, create new labels as incoming labels, and further insert the new labels to the second message prior to sending the second message to the next routing device.

Thus, according to the method 500, when an ingress routing device associated with the source host receives the second message, the ingress routing device knows what label it should assign for the data flow from the source host.

Figure 6:
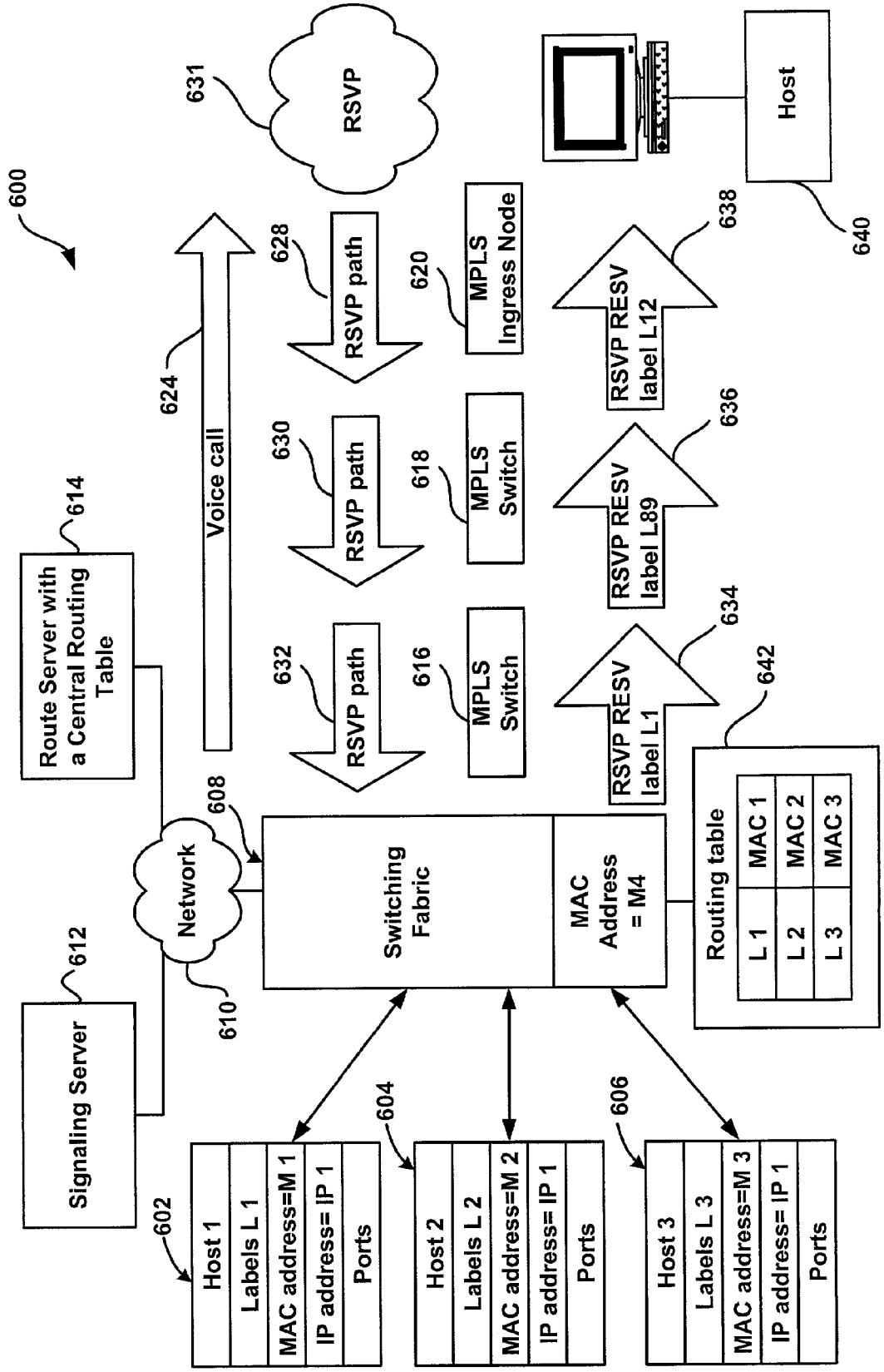
FIG. 6 is a block diagram illustrating a system for creating a label switching path for a host according to an exemplary embodiment.

FIG. 6 is a block diagram illustrating an exemplary system 600 that employs an MPLS to create a label switched path between a source host and one or more destination hosts that share a common external network address for communicating with network devices on an external network. The exemplary system 600 includes a first host 602, a second host 604 and a third host 606 having a common globally-routable network address such as a Layer 3 address, according to the OSI model, an IP address, IP1. The first host 602, the second host 604, and the third host 606 may include modules that implement VoIP communication having unique physical addresses such as Layer 2 addresses. For example, the Layer-2 addresses may include unique MAC addresses for each host. As illustrated in FIG. 6, network addresses M1, M2, and M3 are associated with the first host 602, the second host 604, and the third host 606, respectively. Further, according to an exemplary embodiment, each host is associated with a predetermined label assigned to the host. As illustrated in FIG. 6, labels L1, L2, L3 are associated with respective hosts 602, 604, 606. Further, the first host 602, the second host 604, and the third host 606 include sub-identifier fields containing a range of port numbers that may be assigned to each host.

The first host 602, the second host 604 and the third host 606 are coupled to a switching fabric 608 and to a network 610. The network 610 may include any type of network that use any type of message transmission for sending information between entities. For example, the network 610 may include an Ethernet, or a LAN. The switching fabric 608 may include any switch used to switch data. For example, the switching fabric 608 may include a multi-layer Ethernet switch with a network processor. The switching fabric 608 is connected to an egress network such as a wireless network, an IP network, the Internet, an ATM network, a frame relay network, or a different type of network. Other examples or combinations of networks are possible as well.

As illustrated in FIG. 6, the switching module 608 communicates with a routing module 642 that may include a central master routing table. The central master routing table includes mappings between labels such as MPLS labels and corresponding Layer 2 MAC addresses. In one embodiment, the switching fabric 608 may include a copy of the central master routing table.

Further, FIG. 6 illustrates a plurality of MPLS switches 616, 618 and 620 through which a label switched path is created between a source host 640 using an RSVP 631. FIG. 6 illustrates a voice call message 624 that the signaling server 612 sends to the host 640 upon the detection of an incoming call and allocation of a port on one of the hosts, such as the host 602. Upon a receipt of the voice call message 624, the MPLS ingress node of the host 640 initiates an RSVP process to allocate QoS service at each node to the host 602, and, further, to create a label switching path from the host 640 to the host 602. As illustrated in FIG. 6, the MPLS ingress node creates an RSVP PATH message 628 that is routed via MPLS switches 618 and 616 to the switching fabric 608.

Once the switching fabric 608 receives the RSVP PATH message 632, the switching fabric 608 forwards the RSVP PATH message 632 to a centralized route server 614. In one embodiment, the centralized route server 614 is a centralized network entity arranged to allocate IP addresses and unique identifiers, such as UDP ports, for VoIP calls, and may be arranged to keep a record associated with each set of allocated parameters. Further, the centralized route server 614 is arranged to allocate labels for each host, aggregate calls associated with each host to one of the labels associated with that host so that the labels can be reused. Additionally, the centralized route server 614 may create mapping tables, and process any incoming messages. Thus, in the exemplary embodiment illustrated in FIG. 6, when the switching fabric 608 receives the RSVP PATH message 632, the switching fabric 608 forwards the message 632 to the centralized route server 614. The RSVP PATH message 632 includes a destination IP address and a destination port of a host. Thus, since the centralized route server 614 keeps a record of all allocated parameters for the calls, such as ports and IP addresses, the centralized route server 614 may use the destination IP address and the destination port in the received RSVP PATH message 632 to determine whether a label has been allocated to the host, such as the host 602. If the label has not been earlier assigned to destination host 602, the central route server 614 allocates a new label for the destination host 602 and updates the central master mapping table so that the table includes a new mapping between the MAC address of the destination host 602 and the assigned label. For example, as shown in FIG. 6, a label L1 is assigned to the destination host 602 having a physical network address M1. If the central routing table on the routing server 614 includes an entry defining the mapping between the MAC address and the label for the receiver host, the switching fabric aggregates the data flow to the existing label for the host.

Upon an aggregation of the data flow to the existing label, or a creation of a new label, the information regarding the label for the data flow is provided to the neighboring MPLS switch 616 in an RSVP RESV message 634. In the exemplary embodiment, the RSVP RESV message 634 includes the label L1 in the LABEL object of the message. As the RSVP RESV message 634 traverses in MPLS domain towards the ingress node 620 at the host 640, the label is allocated at each MPLS switch to a new label, thus, creating a label switched path. As illustrated in FIG. 6, the MPLS switch 616 allocated a label L89 and sends it to the MPLS switch 618 in a RSVP RESV message 636. Upon a receipt of the RSVP RESV message 636, the MPLS switch 618 allocates a new label L12 and forwards it in a RSVP RESV message 638 to the MPLS ingress node 620. Upon a receipt of the RSVP RESV message 638, the MPLS ingress node 620 knows what label it should assign to data flows from the host 640 to the host 602.

It should be understood that the exemplary system 600 in FIG. 6 is not limited to the shown network devices, and more, fewer or different components or connections could also be used. Further, those skilled in the art will appreciate that other arrangements and other elements, such as interfaces or functions, whether or not known in the art, can be used instead, and some elements may be omitted altogether. For example, the exemplary system is not limited to three hosts or three MPLS switches, and fewer or more hosts and MPLS switches could also be used.

Figure 7:
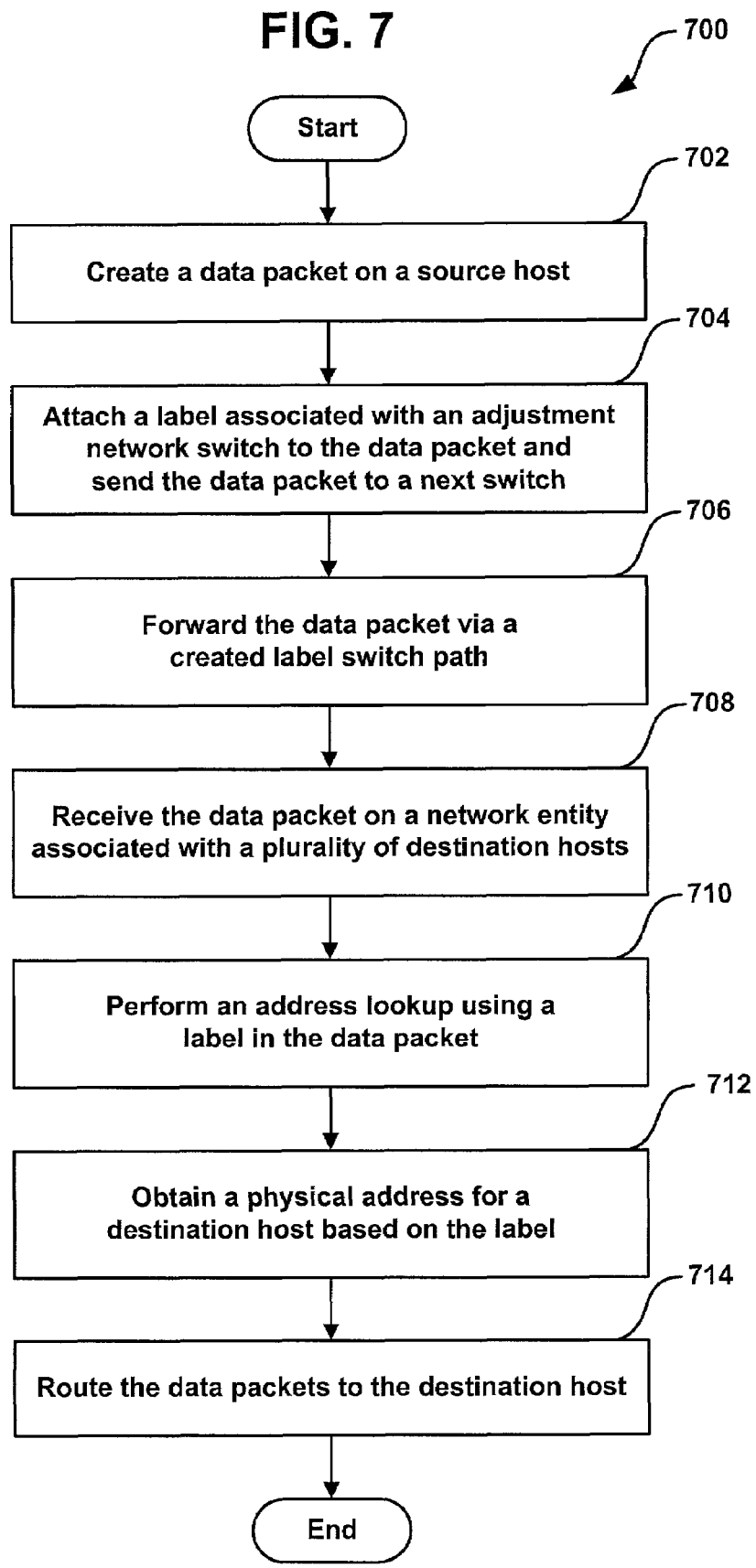
FIG. 7 is a flow chart illustrating a method for processing incoming data flows on a network switch according to an exemplary embodiment.

FIG. 7 is a flow chart illustrating an exemplary method 700 for processing incoming data flows on a network switch according to an exemplary embodiment employing an MPLS for routing the incoming data flows to one of destination hosts that share the same globally routable address such as a globally routable IP address.

At step 702, a data packet is created on a source host. The data packet may include a VoIP packet having an address field and a data field. The address field may include a globally routable network address and a port number of a destination host. At step 704, the source host attaches a label to the data packet and forwards the data packet to an adjacent network routing device. In one embodiment, the label includes an MPLS label received from the adjacent network routing device, such as an MPLS ingress node switch, upon a completion of the RSVP process. At step 706, the adjacent network routing device forwards the data packet via a label switching path created during the RSVP process. Therefore, when a next MPLS switch receives the data packet from the ingress MPLS node switch, the next switch swaps the received label with a new label for an adjacent switch on the label switch path.

At step 708, a network entity associated with the plurality of destination hosts receives the data packet from an adjacent MPLS node switch. In an exemplary embodiment illustrated in FIG. 6, the network entity includes the switching fabric 608. According to an exemplary embodiment, the received data packet includes a predetermined label that was inserted to the data packet by the last adjacent MPLS switch on the label switch path. At step 710, the network entity performs an address look-up using the label specified in the data packet. According to an exemplary embodiment, the network entity may retrieve a copy of a master routing table to determine the mapping of the label to a predetermined network address associated with one of the receiver hosts. At step 712, the network entity obtains a physical address of a destination host based on the label in the received data packet. For example, in the embodiment illustrated in FIG. 6, the adjacent MPLS switch 616 inserts the label L1 to the data packet based on the label switching path established during the RSVP process for sending data from the host 640 to the host 602, and the switching fabric 608 receives the data packet with the label L1. In such an embodiment, the switching fabric 608 performs the address look-up using the label L1, and maps the label L1 to the physical network address M1 associated with the host 602.

At step 714, the network entity routes the data packet to the receiver host using the physical network address that has been determined based on the label attached to the received data packet. Execution then ends, and the data packet is further processed on the host 602.

Figure 8:
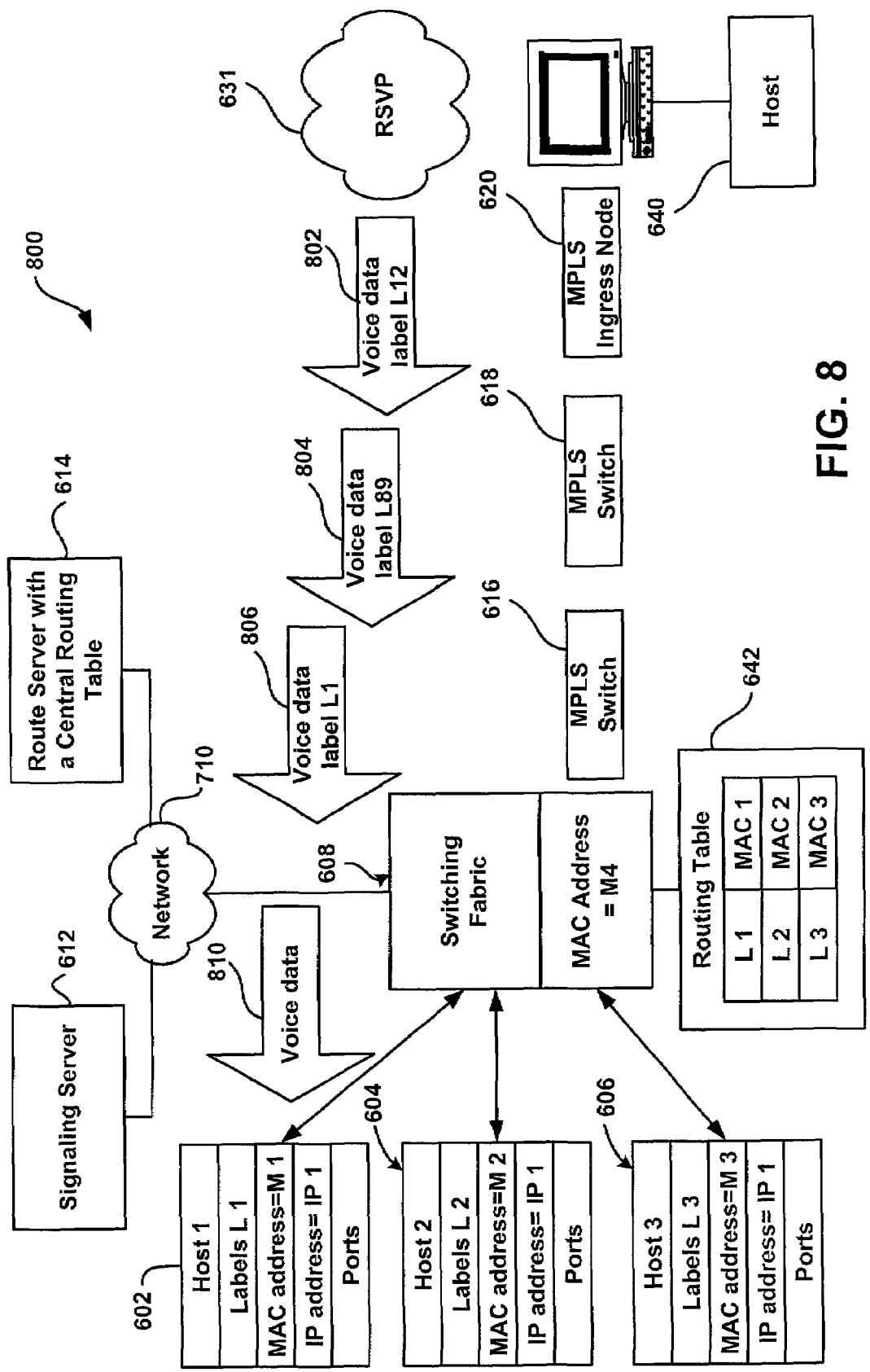
FIG. 8 is a block diagram illustrating a system for processing incoming data flows on a network switch according to an exemplary embodiment.

FIG. 8 is a block diagram illustrating an exemplary data packet flow to a destination host from a source host in an exemplary system 800 according to one embodiment. The exemplary system 800 includes network entities described in reference to FIG. 6. Referring to FIG. 8, the MPLS ingress node associated with the host 640 attaches an egress label to a data packet received from the host 640. According to an exemplary embodiment, the host 640 transmits data packets to the host 602 that shares an external globally-routable network address, IP1 address, with a plurality of hosts. As illustrated in FIG. 8, the MPLS ingress node attaches a label L12 to the data packet and sends a data packet 802 to the adjacent MPLS switch 618. Upon a receipt of the data packet 802, the MPLS switch 618 swaps the received label L12 to an outgoing label L89, thus, creating the data packet 804, and sends the data packet 804 to the next adjacent switch, the MPLS switch 616. Upon a receipt of the data packet 804, the MPLS switch 616 swaps the label L89 to an outgoing label L1, thus, creating a data packet 806, and sends the data packet 806 to the switching fabric 608.

Once the switching fabric 608 receives the data packet 806 having the label L1, the switching fabric 608 invokes a copy of a master mapping table to determine a network address of a destination host. Alternatively, if the switching fabric 608 does not have a copy of a mater mapping table, the switching fabric 608 may retrieve the master mapping table from the central route server 614. Once the switching fabric 608 accesses the master mapping table, the switching fabric 608 performs an address look-up for a destination host using the label in the received data packet 806. In the exemplary embodiment, the received data packet 806 is labeled with the label L1 that maps to a physical network address M1 of the host 602, as shown in the routing table 642. Once the switching fabric 608 determines the physical network address, the switching fabric 608 rewrites a physical address in the data packet 806 to the physical network 20 address M1 and routes the data packet to the destination host 602.

FIG. 9 is a block diagram illustrating an exemplary system 900 operating according to an exemplary embodiment. The system 900 illustrates two hosts 902 and 910 coupled to a local area network 918. The local area network 918 is coupled to a switching fabric 920. The switching fabric 918 is coupled to routers 940. According to an exemplary embodiment, a plurality of MPLS switches is illustrated as a single block 940. The routers 940 are coupled to an egress network 944. A third host 946 is coupled to the egress network 944. A mapping table 930 is coupled to the switching fabric 920.

The first host 902 includes a globally-routable address field 904 with contents IP1, a port field 906 with contents having assigned ports such as, for example, UDP/TCP ports, and a physical address field 908 with contents MAC1.

The second host 910 includes a globally-routable address field 912 with contents IP1, a port field 914 with contents having assigned ports such as, for example, UDP/TCP ports, and a physical address field 916 with contents MAC2.

The third host 946 includes a globally-routable address field 948 with contents IP2. The switching fabric has a physical address field 922 with contents MAC 3. The mapping table 930 has a label column 936 and a physical address column 938. The table has two rows 932 and 934. The table 930 indicates that labeled data packets having a label L1 have a physical address of M1, and labeled data packets having a label L2 have a physical address of M2.

In one embodiment, the host 946 generates a packet with the host 902 as a destination host, and the packet is forwarded via a label switched path via routers 940 to the switching fabric 920. FIG. 9 illustrates a packet 950 that the switching fabric 920 receives from an adjacent MPLS switch via the label switch path. The packet 950 has a label field 952 with contents of L1, a port number field 954 with a port number of 2002 assigned for data flow on one of the hosts sharing the globally routable network address, a destination globally routable address field 956 with contents of IP1, a destination physical address field 958 with contents M3, a source physical network address field 960 with contents of M5 of an adjacent MPLS switch, a source globally-routable network address field 962 with contents of IP2, and source port number field 964 with contents 6001 associated with a port number allocated on the host 946 for the data flow. In one embodiment, the physical address fields include Layer 2 addresses such as MAC addresses, the globally-routable fields include Layer 3 addresses such as IP addresses, and the port number fields include Layer 4 addresses such as UDP/TCP port numbers. However, it should be understood that different embodiments are possible as well, and the exemplary fields may include different types of addresses or identifiers. Further, it should be understood that the illustrated packet formats include other fields, such as data fields or header fields, in addition to the shown fields.

Once the switching fabric 920 receives the data packet 950, the switching fabric 920 obtains the mapping table 930 and examines the label field 952 in the data packet 950. The switching fabric 920 then finds the physical address in the mapping table that corresponds to the label retrieved from the data packet 950. In this embodiment, the label field 952 includes the label L1 that corresponds to the physical address MAC1 in row 932 of the mapping table 930.

The switching fabric 920 replaces the physical address (MAC3) in the packet 950 and removes the label L1 from the label field 952, and forms a data packet 970 with the physical address MAC1 in the physical address field 976. The packet 970 is then routed to the destination host 902.

It should be understood that the programs, processes, methods and systems described herein are not related or limited to any particular type of computer or network system (hardware or software), unless indicated otherwise. Various types of general purpose or specialized computer systems may be used with or perform operations in accordance with the teachings described herein.

In view of the wide variety of embodiments to which the principles of the present invention can be applied, it should be understood that the illustrated embodiments are exemplary only, and should not be taken as limiting the scope of the present invention. For example, the steps of the flow diagrams may be taken in sequences other than those described, and more or fewer elements may be used in the block diagrams. While various elements of the preferred embodiments have been described as being implemented in software, in other embodiments in hardware or firmware implementations may alternatively be used, and vice-versa.

It will be apparent to those of ordinary skill in the art that methods involved in the system for providing masquerading using MPLS may be embodied in a computer program product that includes a computer usable medium. For example, such as, a computer usable medium can include a readable memory device, such as a hard drive device, CD-ROM, a DVD-ROM, or a computer diskette, having computer readable program code segments stored thereon. The computer readable medium can also include a communications or transmission medium, such as, a bus or a communication link, either optical, wired or wireless having program code segments carried thereon as digital or analog data signals.

The claims should not be read as limited to the described order or elements unless stated to that effect. Therefore, all embodiments that come within the scope and spirit of the following claims and equivalents thereto are claimed as the invention.

What is claimed is:

1. A method for routing information between a first host on a first network and a plurality of hosts on a second network, the method comprising:
    establishing a routing path between the first host on the first network and one of the plurality of hosts on the second network, the plurality of hosts on the second network sharing a globally-routable network address;
    establishing a routing table comprising a plurality of physical network addresses for the plurality of hosts on the second network, each of the plurality of physical network addresses associated with a respective unique destination identifier comprising a multiprotocol label switching (MPLS) label;
    receiving a message from the first host, the message comprising (i) the shared globally-routable network address, and (ii) a destination identifier associated with one of the plurality of physical network addresses;
    determining a physical network address in the routing table using the destination identifier received in the message;
    mapping the physical network address to the message; and
    routing the message to one of the plurality of hosts on the second network using the physical network address.

2. The method of claim 1, wherein the routing path comprises a multiprotocol label switched path.

3. The method of claim 2, wherein the label switched path is established using a Resource Reservation Protocol.

4. The method of claim 3, further comprising:
    delivering Quality of Service (QoS) requests to one or more nodes between the first host and the one of the plurality of hosts on the second network; and
    establishing and then maintaining states of the one or more nodes so as to provide the requested QoS;
    wherein the delivering, establishing, and maintaining functions are carried out using the Resource Reservation Protocol.

5. The method of claim 1, wherein the physical network address comprises a medium access control address.

6. The method of claim 1, wherein the destination identifier is created during the step of establishing the routing path from the first host on the first network to the one of the plurality of hosts on the second network.

7. A system for routing messages, comprising in combination:
    a local routing table comprising a plurality of physical network addresses and a respective unique destination identifier associated with each of the plurality of physical network addresses wherein each unique destination identifier comprises a multiprotocol label switching (MPLS) label;
    a host on a first network;
    a plurality of local hosts on a second network, the plurality of local hosts having the plurality of physical network addresses and sharing a globally-routable network address;
    a local processing module for (i) determining a physical network address upon a receipt of a message comprising the shared globally-routable network address and a destination identifier from the host on the first network, and (ii) transmitting the message to one of the plurality of hosts on the second network using the physical network address,
    wherein the local processing module determines the physical network address based on the destination identifier using the local routing table.

8. The system of claim 7, wherein the plurality of physical network addresses comprises a plurality of medium access control network addresses, and the globally-routable network address comprises an Internet Protocol address.

9. The system of claim 7, further comprising an MPLS label switched path including at least a first MPLS switch and a second MPLS switch,
    wherein the first MPLS switch is between the host on the first network and the second MPLS switch, and
    wherein the first MPLS switch provides information regarding the MPLS label of one of the unique destination identifiers to the second MPLS switch for use in creating the MPLS label switched path.

10. The system of claim 7, wherein one or more of the plurality of physical network addresses is associated with a plurality of multiprotocol label switching labels.

11. A method for transmitting data, the method comprising:
    establishing a routing path from a first host on a first network to a second host on a second network, the second host comprising a unique data link layer address and sharing a globally-routable network layer address with a plurality of hosts on the second network;

allocating a destination identifier for the data link layer address associated with the second host, wherein the destination identifier comprises a multiprotocol label switching (MPLS) label;

storing the destination identifier with the data link layer address associated with the second host in a routing table, the routing table comprising a plurality of data link layer addresses associated with the plurality of hosts on the second network, wherein each of the plurality of data link layer addresses is associated with a unique destination identifier;

receiving a message from the first host on the first network, the message comprising the shared globally-routable network address and the destination identifier;

determining the data link layer address based on the received destination identifier using the routing table;

mapping the data link layer address to the message; and routing the message to the second host using the data link layer address determined based on the destination identifier received in the message.

12. A computer readable medium having stored therein instructions for causing a processor to execute the method of claim 11.

13. The method of claim 11, wherein the routing path comprises a label switching path.

14. The method of claim 11, wherein the data link layer addresses associated with the second host comprises a medium access control addresses, and the globally-routable network layer address comprises an Internet Protocol address.

15. The method of claim 11, wherein the message comprises a Voice over Internet Protocol packet.

16. A system for routing messages, comprising in combination:

a centralized routing module for generating a routing table for a switch module associated with a plurality of network entities sharing a globally-routable network address, the routing table comprising (i) a plurality of physical network addresses associated with the plurality of network entities, and (ii) a respective unique destination identifier associated with each physical network address, wherein each unique destination identifier comprises a multiprotocol label switching (MPLS) label; and the switch module for receiving a data packet addressed to the shared globally-routable network address, the data packet comprising a destination identifier associated with one of the physical network addresses, the switch module determining a physical network address by mapping the destination identifier to one of the plurality of physical network addresses in the routing table and routing the data packet to a network entity associated with the determined physical network address.

17. The system of claim 16, wherein each of the unique destination identifiers comprises a data link layer identifier.

18. The system of claim 16, wherein the centralized routing module aggregates at least one data flow associated with each of the plurality of network entities to a destination identifier.

19. The system of claim 16, wherein the centralized routing module allocates a destination identifier for each network host upon a receipt of a Resource Reservation Protocol message for each network host.

20. The system of claim 16, wherein upon the allocation of the destination identifier for each network host, a routing path is created for each host.

* * * * *